United States Patent [19]
Lee

[11] Patent Number: 5,987,937
[45] Date of Patent: Nov. 23, 1999

[54] PERIPHERAL LOCKING DEVICE FOR PORTABLE COMPUTERS

[75] Inventor: Myoung-Kyu Lee, Suwon, Rep. of Korea

[73] Assignee: SamSung Electronics Co., Ltd., Suwon, Rep. of Korea

[21] Appl. No.: 09/175,988

[22] Filed: Oct. 21, 1998

[30] Foreign Application Priority Data

Oct. 22, 1997 [KR] Rep. of Korea ............. 97-29333

[51] Int. Cl.$^6$ .................. E05B 73/00; G06F 1/16
[52] U.S. Cl. ............ 70/14; 70/18; 70/58; 248/553; 361/686
[58] Field of Search ............... 70/14, 18, 49, 70/58; 248/553; 361/686

[56] References Cited

U.S. PATENT DOCUMENTS

| | | |
|---|---|---|
| 4,579,311 | 4/1986 | Spranza, III ................. 70/58 X |
| 4,585,202 | 4/1986 | Parsekian ................... 70/58 X |
| 4,843,848 | 7/1989 | Igelmund ................... 70/18 X |
| 5,327,752 | 7/1994 | Myers et al. ................. 70/58 |
| 5,397,176 | 3/1995 | Allen et al. ................. 70/58 X |
| 5,447,044 | 9/1995 | Cheng ...................... 70/58 |
| 5,608,605 | 3/1997 | Siow et al. ................. 70/14 X |
| 5,687,592 | 11/1997 | Penniman .................. 70/14 |
| 5,787,738 | 8/1998 | Brandt et al. ............... 70/58 |
| 5,870,283 | 2/1999 | Maeda et al. ............... 70/58 X |

*Primary Examiner*—Lloyd A. Gall
*Attorney, Agent, or Firm*—Robert E. Bushnell, Esq.

[57] ABSTRACT

A device is provided that can be used to lock auxiliary, or peripheral, devices in portable computers. A portable computer using the device may be constructed using a housing, or body, for the portable computer that has a recessed peripheral port in a side wall of the computer body. A peripheral port is then engageable with the port in the side wall of the portable computer. A face plate on the front side of the peripheral port has a greater area than the area of the front side of the peripheral device, forming a rim around the peripheral device that fits flush with the outer surface of the body. A bracket and a locking unit are then used to secure the peripheral device to the portable computer.

19 Claims, 3 Drawing Sheets

PERIPHERAL LOCKING DEVICE FOR PORTABLE COMPUTERS

CLAIM OF PRIORITY

This application makes reference to, incorporates the same herein, and claims all rights accruing thereto under 35 U.S.C. §119 through my patent application entitled Apparatus for Locking Auxiliary Devices in Portable Computers earlier filed in the Korean Industrial Property Office on the 22nd day of Oct. 1997 and there duly assigned Ser. No. 1997/29333.

BACKGROUND OF THE INVENTION

1. Field of the Invention

The present invention relates to an apparatus for locking auxiliary devices in portable computers and, more specifically, to an apparatus capable of both locking portable computers to a support member and capable of locking auxiliary devices, such as hard disk drives, inside the portable computers.

2. Background Art

Portable computers, such as laptop and notebook computers, now include ports that can accommodate modular components such as hard disk drives and compact disk read only memory drives that can be removed, swapped out, or upgraded. The housings for such portable computers have been downsized to the point that the internal spatial requirements of such computers have required the establishment of standards for the internal accessories of the computer. The reduced size of high priced electronic devices promotes efficiency due to their ease of transportation and storage. However, it is this same compactness and modularity of portable computers, as well as peripherals, that has resulted in an increased need for security devices that can prevent theft or vandalism of the portable computer or its components.

One method for locking a portable computer to a support is shown in U.S. Pat. No. 5,447,044 to Cheng entitled Apparatus for Locking a Notebook Computer on a Computer Support. Cheng '044 shows a block that is secured by a bolt to a portable computer. The bolt is seated in a counterbored hole in the block while a padlock, that is also connected to a chain, is attached to a second bore in the block. Another method for securing a portable computer is shown in U.S. Pat. No. 5,787,738 to Brandt entitled Security Lock for a Laptop Computer. Brandt '738 shows a blade that is inserted between a cover and a base of a portable computer and secured on one end by a lock. U.S. Pat. No. 5,608,605 to Siow entitled Apparatus for Securing a Device via PC Card Slot and Door illustrates the use of a PC card slot to secure a portable computer to a support. One type of lock that can be used to secure a portable computer to a cable is shown in U.S. Pat. No. 5,327,752 to Myers entitled Computer Equipment Lock. The above patents primarily relate to the securing of the portable computer itself. This still leaves the need for security devices that not only secure portable computers, but also secure peripheral devices to the portable computer itself.

One device that can both secure a portable computer and secure a peripheral to a portable computer is shown in U.S. Pat. No. 5,687,592 to Penniman entitled Mechanical Lock for a Removable Hard Disk Drive and a Removable Memory Card. This device is inserted into the housing of the portable computer and a latch is rotated to secure the device to the portable computer. In addition, the device has a circular flange that contacts the outer surface of the housing and increases the amount of area, along the outside of the housing, that is covered by the device. By attaching the device proximate to a peripheral, the device covers a portion of the peripheral device with the flange and prevents the removal of the peripheral device from the portable computer. Covering a portion of a peripheral device, however, can interfere with the use of the peripheral devices and reduce the efficiency of the portable computer user.

As such, I believe that it may be possible to improve on the contemporary art by providing a device that can secure portable computers to a structure, that can secure peripheral devices to the portable computer, that is easy to attach, that does not reduce the efficiency with which the computer can be used, and that is economical to manufacture.

SUMMARY OF THE INVENTION

Accordingly, it is an object of the present invention to provide an improved device for both securing a portable computer to an external support structure and securing peripheral devices to the portable computer.

It is another object to provide a device for both securing a portable computer to an external support structure and securing peripheral devices to the portable computer that is easy to attach.

It is still another object to provide a device for both securing a portable computer to an external support structure and securing peripheral devices to the portable computer that does not interfere with the use of peripherals.

It is yet another object to provide a device for both securing a portable computer to an external support structure and securing peripheral devices to the portable computer that is economical to manufacture.

To achieve these and other objects, a device is provided that can be used to lock auxiliary, or peripheral, devices in portable computers. A portable computer using the device may be constructed using a housing, or body, for the portable computer that has a recessed peripheral port in a side wall of the computer body. Proximate to the peripheral port is a first slot and on the inner surface of the side wall are two guide rails that run along opposite sides of the first slot. On the inner surface of the bottom side of the body a post may be attached. A bracket is engageable with both the pair of guide rails and the post. The bracket has a second slot that is aligned with the first slot in the body when the bracket is fully engaged with the pair of guide rails.

A peripheral device is then engageable with the port in the side wall of the portable computer. A face plate on the front side of the peripheral device has a greater area than the area of the front side of the peripheral device, forming a rim around the peripheral device. In the rim is a third slot that is aligned with the first slot in the body while the peripheral device is engaged with the peripheral port. Because the peripheral port is recessed into the computer body, the rim of the peripheral device is flush with the outer surface of the computer body.

A locking unit is then used to secure the peripheral device to the computer by securing the first slot, second slot, and third slot together. The locking unit may use a substantially drum shaped housing that has a rotatable latch on one end. While the latch is in one position the latch can be inserted through the slots in the computer body, bracket, and peripheral device. Once the latch has been inserted a key may be used to rotate the position of the latch and prevent the latch from being removed. On a second end of the locking unit's housing is a keyhole to allow the locking unit's latch to be key-turnable (ie. rotatable when a key is inserted in the locking unit's housing and turned). Once the locking unit is inserted and secured the peripheral device is secured to the portable computer and the theft, or loss, of the peripheral is prevented. Furthermore, a cable or chain can be attached to the second end of the locking unit to allow the portable computer to be secured to a computer supporting structure.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
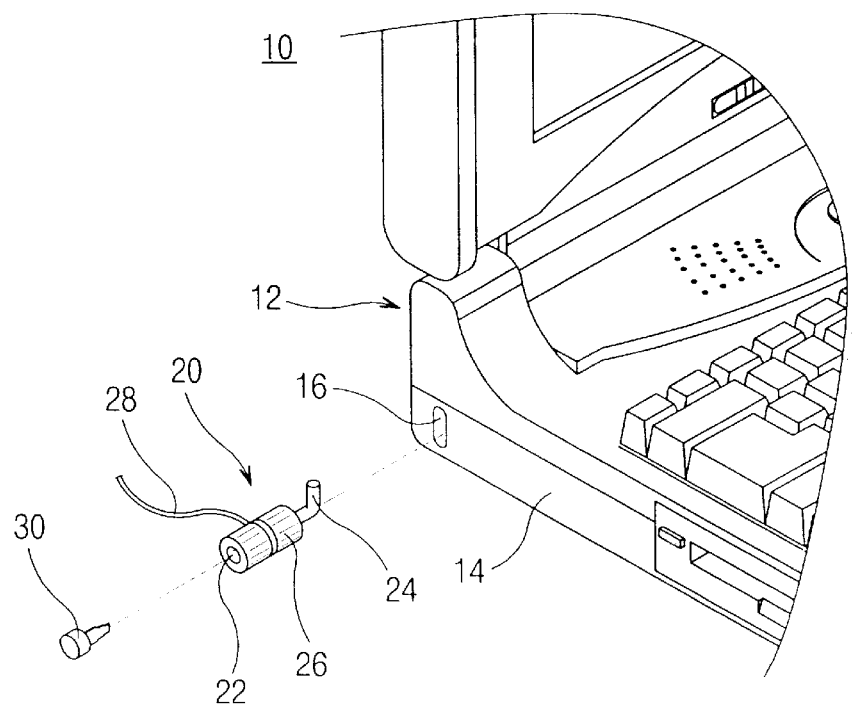
FIG. 1 in a perspective view of a locking apparatus for a portable computer.

Turning now to the drawings, FIG. 1 illustrates a device for locking peripheral devices in portable computers. Main body 12 of portable computer 10 has hole 16 in panel 14. The device also uses locking unit 20 that has body 26. Body 26 may be optionally attached to metal wire 28. Body 26 has both keyhole 22 at one end and rotatable latch 24 at the other end. Latch 24 is inserted into hole 16 of panel 14. Wire 28, extending from body 26, may be attached to a computer supporting structure (not shown).

Latch 24 of locking unit 20 is inserted into the hole 16 prior to inserting key 30 into keyhole 22 of the locking unit. Then, key 30 is rotated at a predetermined amount and latch 24 is rotated in the same direction and caught by the body of the portable computer. Thus, preventing the latch from being removed from hole 16. While wire 28 of locking unit 20 is connected to a computer supporting structure, computer 10 is harder to steal of lose.

Figure 2:
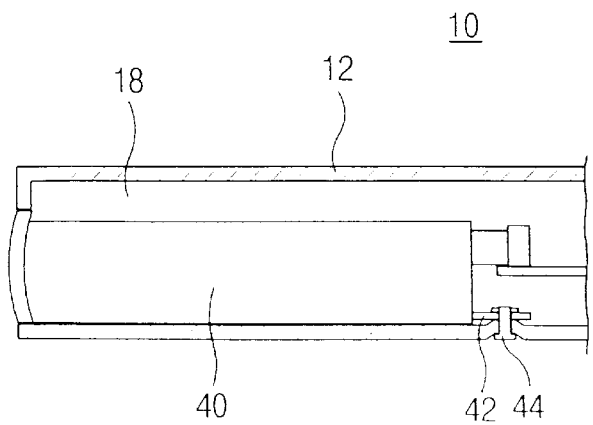
FIG. 2 is a side view showing a device for securing a peripheral device in a portable computer.

FIG. 2 illustrates peripheral device 40 inserted into seat 18 of body 12 of computer 10. Seat 18 extends from the external surface of panel 14 to a predetermined depth inside body 12. The inside edge of device 40 has holed locking flange 42, while the bottom wall of main body 12 has a screw hole at a position corresponding to the screw hole in locking flange 42. After inserting peripheral device 40 into seat 18, peripheral device 40 is fastened to the bottom wall of body 12 using screw 44.

Figure 3:
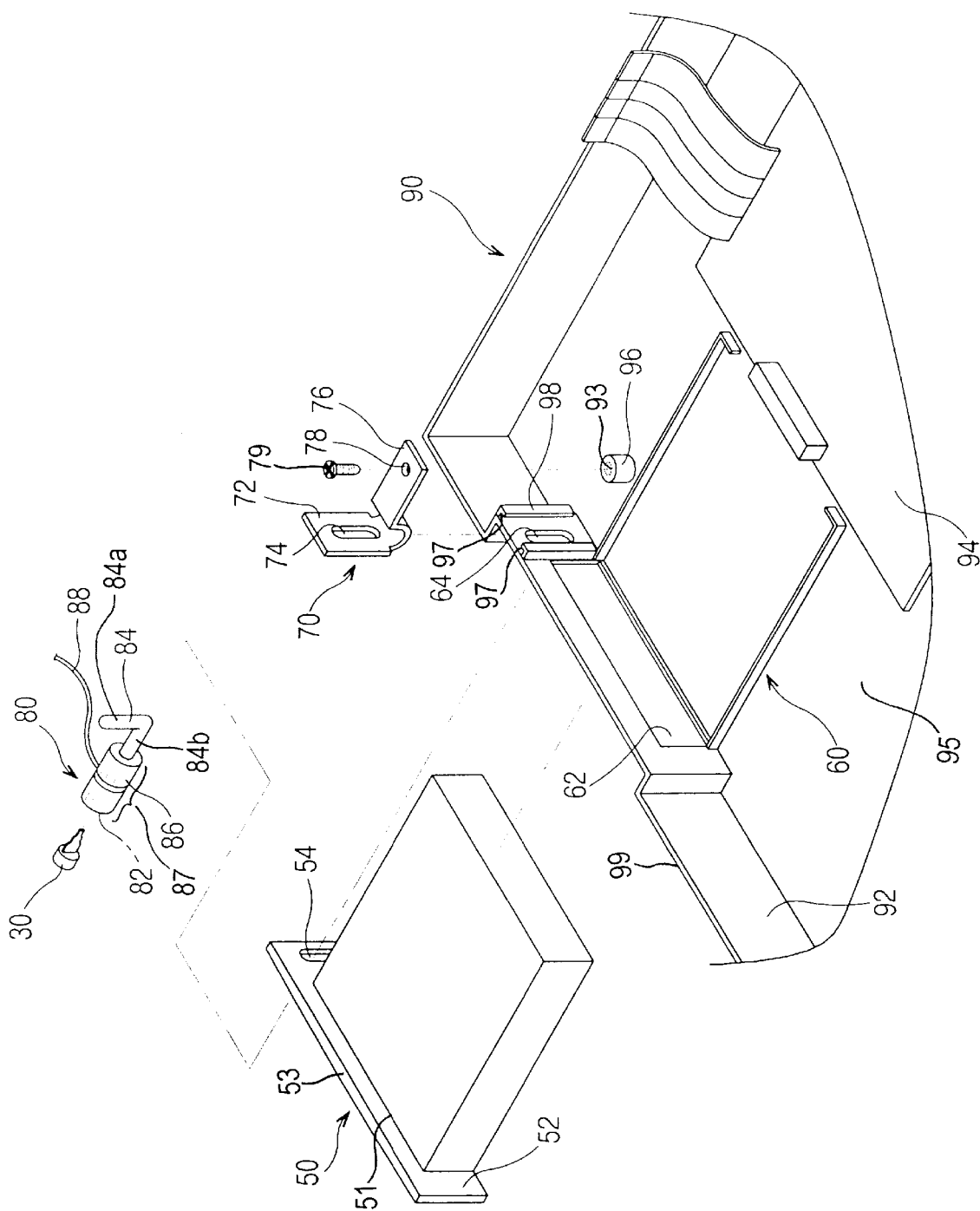
FIG. 3 is an exploded perspective view showing a device for securing a peripheral device to a portable computer as constructed according to the principles of the present invention.

FIG. 3 illustrates a computer using a device to secure a peripheral device to a portable computer as constructed in accordance with the preferred embodiment of the present invention. A portable computer using the device may be constructed using housing, or body, 90. Body 90 has recessed peripheral port 62 in side wall 92 of computer body 90. Proximate to peripheral port 62 is first slot 64 and on the inner surface of side wall 92 are two guide rails 98 that run along opposite sides of first slot 64. On the inner surface of bottom side 95 of body 90 post 96 may be attached. Bracket 70 is engageably attached with both pair of guide rails 98 and post 96. First portion 72 of bracket 70 is inserted inside slots 97 formed by pair of guide rails 98. At the same time, second portion 76 of bracket 70 is brought into abutting contact with post 96. Then fastener 79 is inserted through bore 78 of bracket 70 and into bore 93 in the post. Bracket 70 has second slot 74 that is aligned with first slot 64 in body 90 when bracket 70 is fully engaged with the pair of guide rails.

Peripheral device 50 is then engageable with peripheral port, or port, 62 in side wall 92 of the portable computer. Face plate 53 on front side 51 of the peripheral device has a greater area than the area of the front side of the peripheral device, forming rim 52 around the peripheral device. In rim 52 is third slot 54 that is aligned with first slot 64 in the body while the peripheral device is engaged with the peripheral port. Because peripheral port 62 is recessed into computer body 90, rim 52 of the peripheral device is flush with outer surface 99 of the computer body.

Locking unit 80 is then used to secure peripheral device 50 to the computer by securing first slot 64, second slot 74, and third slot 54 together. The locking unit may use substantially drum shaped housing 87 that has rotatable latch 84 attached on one end 86. While bent portion 84*a* of latch 84 is in a position perpendicular to the bottom side of the portable computer, latch 84 can be inserted through the slots in the computer body, bracket, and peripheral device. The length of straight portion 84*b* of latch 84 depends on the thickness of rim 52, the thickness of computer body 90, and the thickness of bracket 70. Once latch 84 has been inserted key 30 may be used to rotate the position of latch 84 to prevent the latch from being removed. On second end 82 of locking unit's housing 86 is a keyhole (not shown) to allow the locking unit's latch to be key-turnable (ie. rotatable when a key is inserted in the locking unit's housing and turned). Once locking unit 80 is inserted and secured peripheral device 50 is secured to portable computer 90 and the theft, or loss, of the peripheral is prevented. Furthermore, cable, or chain, 88 can be attached to the second end of the locking unit to allow the portable computer to be secured to a computer supporting structure.

Figure 4:
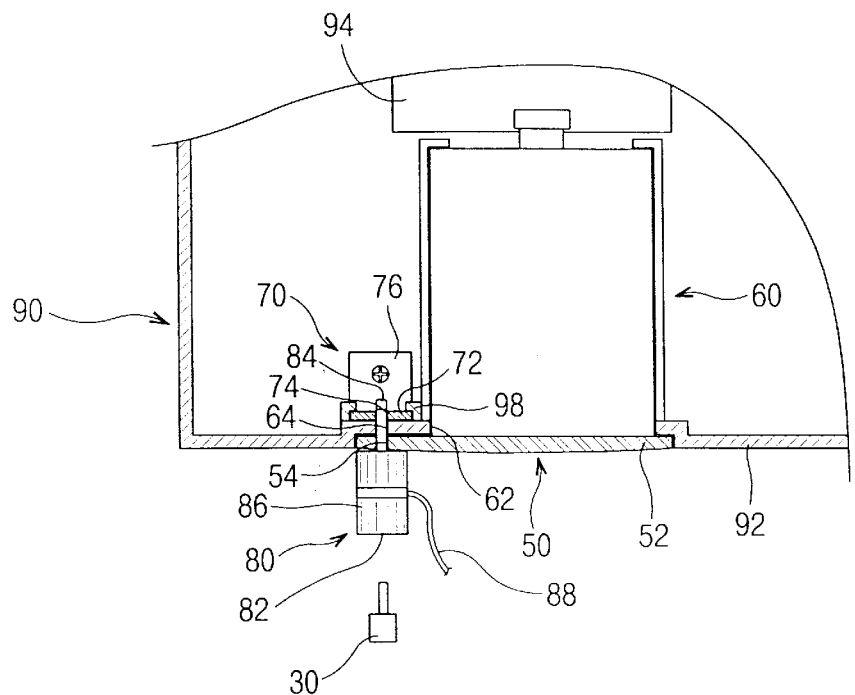
FIG. 4 is a plan sectional view of the device of FIG. 3 with the various components shown in an assembled state.
Figure 5:
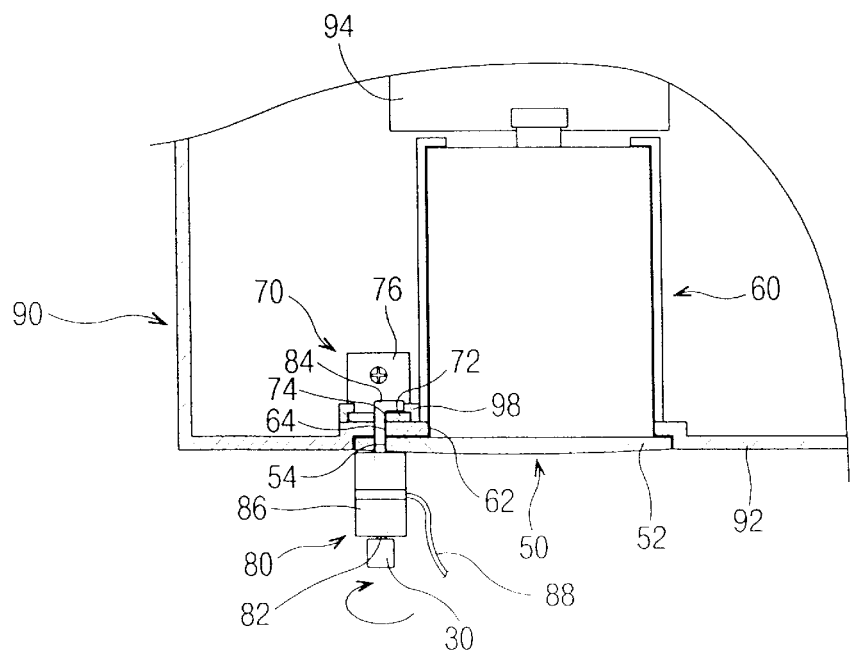
FIG. 5 is a plan view showing the device of FIG. 3 with the latch of the locking device rotated to a securing position to prevent the removal of the peripheral device from the portable computer.

A plan sectional view of the device of FIG. 3 is shown in FIG. 4. FIG. 5 illustrates the device of FIG. 4 in a position where latch 84 secures peripheral device 50 to the portable computer. Peripheral device 50 is inserted into body 90 of the computer through the port 62, thus being seated on seat 60 of main body 90. Once positioned on seat 60, peripheral device 50 is electrically connected to main circuit board, or central processing unit, 94 of the portable computer.

First portion 72 of bracket 70 engages pair of guide rails 98 that are attached to the inner surface of side wall 92. Second portion 76 of bracket 70 is fastened to boss 96 (not shown) of body 90 via bore 78. Latch 84 is inserted through third slot 54 in the rim of the peripheral device, through first slot 64 in computer body 90, and through second slot 74 in bracket 70.

To secure peripheral device 50 in the portable computer, latch 84 of locking unit 80 is inserted and rotated due to the action of key 30 rotating a predetermined amount in one direction. The appropriate motion of key 30 results in latch 84 rotating until the bent portion is substantially parallel with the bottom side of the computer body, as shown in FIG. 5. Depending on the exact dimensions of the computer body and latch, the latch may actually rest on the end of one of the pair of guide rails when it is in a secured position. Thus, peripheral device 50 is prevented from being removed from main body 90 of the computer. When wire 88 of locking unit 80 is locked to a computer supporting structure (not shown), the computer is prevented from being lost or stolen.

To separate peripheral device 50 from the computer, key 30 is inserted into keyhole 82 of locking unit 80 and key 30 is turned in the opposite direction from that used during the locking operation. Latch 84 is shown in the position needed to be released from the computer, bracket, and peripheral device in FIG. 4.

The device of the present invention helps prevent the peripheral devices of portable computers from being lost or stolen. The apparatus also helps prevent portable computers from being lost or stolen. The device of this invention effectively locks peripheral devices in a portable computer without impeding the use of such peripheral devices. As such, the device prevents portable computers and associated peripheral devices from being lost or stolen. The device also prevents high value-added data that is stored in the portable computer from being lost along with the computer.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A portable computer, comprising:
   a body having a bottom side and a side wall, said body enclosing a central processing unit and comprising:
      said side wall having a port for receivably engaging a peripheral device;
      a first slot in said side wall proximate to said port; and
      a pair of guide rails each disposed along opposite sides of said first slot on an inner surface of said side wall;
   a bracket slidably engaged with said pair of guide rails and comprising:
      a second slot aligned over said first slot in said side wall while said bracket is engaged with said pair of guide rails; and
      a portion fastenably engageable with said bottom side of said body;
   said peripheral device engageable with said port and comprising:
      a face plate forming a rim around a front side of said peripheral device; and
      said rim bearing a third slot alignable over said first slot in said body while said peripheral device is engaged with said port in said body;
   a locking unit engageable with said peripheral device, said body, and said bracket, said locking unit comprising:
      a housing;
      a latch rotatably attached to one end of said housing; and
      a second end of said housing bearing a key-turnable portion to rotate said latch;
   said locking unit securing said peripheral device in said port of said computer by inserting said latch through said third slot in said rim around said front side of said peripheral device, through said first slot in said body, and through said second slot in said bracket, and turning said key-turnable portion of said locking unit to rotate said latch.

2. The portable computer of claim 1, further comprising said locking unit having a cable attached to said body.

3. The portable computer of claim 1, with said bracket having a substantially L-shape.

4. The portable computer of claim 1, further comprised of said latch being a bent rod.

5. The portable computer of claim 4, further comprised of said latch having a substantially L-shape.

6. The portable computer of claim 1, further comprising said body having a post on said bottom side supporting said bracket and fastenably engageable with said bracket.

7. The portable computer of claim 1, further comprised of said port being recessed into said body causing said rim of said peripheral device to be seatable flush in said body of said portable computer.

8. A portable computer, comprising:
   a body enclosing a central processing unit and having a port for receivably engaging a peripheral device, said body having a first slot in a side wall proximate to said port;
   a bracket slidably engaged in said port and having a second slot aligned over said first slot in said side wall while said bracket is engaged with a pair of guide rails;
   a peripheral device engageable with said port and having a rim around a front side bearing a third slot alignable over said first slot in said body while said peripheral device is engaged with said port in said body;
   a locking unit engageable with said peripheral device, said body, and said bracket; and
   said locking unit securing said peripheral device in said port of said computer by inserting said locking unit through said third slot in said rim of said peripheral device, through said first slot in said body, and through said second slot in said bracket.

9. The portable computer of claim 8, further comprising said locking unit having an attached cable for securing said portable computer to a support structure.

10. The portable computer of claim 8, with said bracket having a substantially L-shape.

11. The portable computer of claim 8, further comprised of said locking unit having a body with a latch attached that is formed by a bent rod.

12. The portable computer of claim 11, further comprised of said latch having a substantially L-shape.

13. The portable computer of claim 8, further comprising said body having a post on an inner surface a bottom side supporting said bracket and fastenably engageable with said bracket.

14. A portable computer, comprising:
   a body having a bottom side and a side wall, said body enclosing a central processing unit and comprising:
      said side wall having a port for receivably engaging a peripheral device;
      a first slot in said side wall proximate to said port;
      a pair of guide rails each disposed along opposite sides of said first slot on an inner surface of said side wall; and
      a post on said bottom side;
   a bracket slidably engaged with both said pair of guide rails and said post, said bracket comprising:
      a second slot aligned over said first slot in said side wall while said bracket is engaged with said pair of guide rails; and
      a portion fastenably engageable with said post on said bottom side of said body;

said peripheral device engageable with said port and comprising:
   a face plate forming a rim around a front side of said peripheral device; and
   said rim bearing a third slot alignable over said first slot in said body while said peripheral device is engaged with said port in said body;
a locking unit engageable with said peripheral device, said body, and said bracket, said locking unit comprising:
   a housing;
   a latch rotatably attached to one end of said housing; and
   a second end of said housing bearing a key-turnable portion to rotate said latch;
said locking unit securing said peripheral device in said port of said computer by inserting said latch through said third slot in said rim around said front side of said peripheral device, through said first slot in said body, and through said second slot in said bracket, and turning said key-turnable portion of said locking unit to rotate said latch.

15. The portable computer of claim 14, further comprising said locking unit having a cable attached to said body.

16. The portable computer of claim 14, with said bracket having a substantially L-shape.

17. The portable computer of claim 14, further comprised of said latch being a bent rod.

18. The portable computer of claim 17, further comprised of said latch having a substantially L-shape.

19. The portable computer of claim 14, further comprised of said port being recessed into said body causing said rim of said peripheral device to be seatable flush in said body of said portable computer.

* * * * *